United States Patent Office 3,378,605
Patented Apr. 16, 1968

3,378,605
BLEND OF N-TERT. BUTYLACRYLAMIDE TERPOLYMER AND GRAFT COPOLYMER THEREOF ONTO RUBBER SUBSTRATE
Massimo Baer, Longmeadow, Mass., assignor to Monsanto Company, St. Louis, Mo., a corporation of Delaware
No Drawing. Filed Sept. 21, 1965, Ser. No. 489,074
14 Claims. (Cl. 260—876)

ABSTRACT OF THE DISCLOSURE

Blends are prepared of (A) 50–99 wt. percent of a terpolymer of a nitrile, a vinylidene aromatic compound and N-tertiary butylacrylamide and (B) 1–50 wt. percent of a graft copolymer having a diene rubber substrate and a terpolymer superstrate of a nitrile, a vinylidene aromatic compound and N-tertiary butylacrylamide. The compositions have improved thermal properties.

---

This invention relates to novel polymeric systems having improved thermal properties. More particularly, it relates to novel diene rubber blends with interpolymers of an ethylenically unsaturated nitrile, a vinylidene aromatic compound, and N-tertiary butylacrylamide.

As is well known, the blending of diene rubbers with styrene and styrene-acrylonitrile polymers has proven particularly advantageous in improving toughness of the products made therefrom. Although such rubber blends are widely used because of their desirable properties, they have been subject to limitation against use in applications wherein thermal stability is important.

In my copending application Ser. No. 326,234, filed Nov. 26, 1963, now U.S. Patent No. 3,313,790, I have disclosed and claimed a novel interpolymer of an ethylenically unsaturated nitrile, a vinylidene aromatic hydrocarbon, and N-tertiary butylacrylamide. Such compositions have been found to have a desirable combination of high glass transition temperature and good thermal stability.

It is an object of the present invention to provide a novel polyblend of a diene rubber in a terpolymer of an ethylenically unsaturated nitrile, a vinylidene aromatic hydrocarbon and N-tertiary butylacrylamide which has improved thermal properties.

It is also an object to provide such a polyblend which is substantially transparent.

Another object is to provide a novel diene rubber for such a polyblend.

Still another object is to provide a method for the preparation of such polyblends.

It has now been found that the foregoing and related objects can be readily attained in a composition comprising an intimate blend of (A) an interpolymer of (1) a nitrile selected from the class consisting of acrylonitrile and methacrylontrile, (2) an N-monosubstituted acrylamide and (3) a vinylidene aromatic hydrocarbon selected from the class consisting of styrene, alpha-methylstyrene, alpha-halostyrenes, aryl-substituted halo and lower alkyl styrenes, and mixtures thereof, and (B) a graft copolymer having (1) a diene rubber substrate and (2) a superstrate containing (a) an N-monosubstituted acrylamide, and at least one compound selected from the class consisting of (i) vinylidene aromatic compounds and (ii) a nitrile selected from the group consisting of acrylonitrile and methacrylonitrile. The acrylamide substituent is selected from the group consisting of alkyl, alicyclic, aralkyl and alkaryl compounds of 3 to 10 carbon atoms, and N-tertiary butyl acrylamide is preferred.

Such compositions have evidenced greatly enhanced thermal properties making them advantageous for applications wherein a tough product is required to operate in a relatively hot environment such as automotive parts and elements of other equipment exposed to temperatures above ambient such as lawnmower casings and various outdoor panels exposed to hot sunlight. By proper formulation, these novel blends may be substantially transparent, thus making them highly advantageous for use as taillights on cars, as signs and for structural applications exposed to sunlight.

Generally, the blends contain 1.0 to 50.0 percent by weight of the graft copolymer and correspondingly 99.0 to 50.0 percent by weight of the interpolymer. The preferred compositions contain about 5.0 to 30.0 percent by weight of the graft copolymer and, accordingly, 95.0 to 70.0 percent by weight of the interpolymer, or 5.0 to 20.0 percent of substrate.

INTERPOLYMER

The interpolymers of this invention are interpolymers of (a) acrylonitrile or methacrylonitrile, or a mixture thereof, (b) one or more vinylidene aromatic compounds, and (c) N-tertiary butylacrylamide.

The vinylidene aromatic compounds employed in the practice of this invention are most usually styrene or alphamethylstyrene. However, equivalent results are obtained using in place thereof substituted alkylstyrenes such as, e.g., ortho-, meta- and para-methylstyrenes, 2,4-dimethylstyrene, para-ethylstyrene, etc.; substituted halostyrenes such as, e.g. alphachlorostyrene, 2,4-dichlorostyrene, ortho-, meta- and para-chlorostyrenes or bromostyrenes, etc.; and substituted alkyl halo styrenes such as, e.g., 2-methyl-4-chlorostyrene, etc. Mixtures of such vinylidene aromatic compounds may be used. The alkyls are generally from 1 to 4 carbons and may include, in addition to those shown above, isopropyl, isobutyl, etc.

The terpolymers may be comprised of the foregoing monomeric compounds in virtually any proportion. However, in a preferred embodiment the terpolymers will be comprised of from about 15 to 70, and more preferably from about 25 to 50 percent by weight of the nitrile monomer, from about 20 to 60, and more preferably from about 25 to 50 percent by weight of the vinylidene aromatic compound and from about 20 to 50, and more preferably from about 15 to 35 percent by weight of N-tertiary butylacrylamide.

The novel terpolymers of this invention may be manufactured by well-known techniques, for example, by mass polymerization, by emulsion or suspension polymerization, etc. Proper polymerization conditions require an acidic media having a pH from about 2 to 6, and preferably from about 3 to 4. Such pH may be obtained through addition of any soluble acid, for example, hydrochloric acid, nitric acid, phosphoric acid, sulfuric acid, sulfurous acid, potassium hydrogen phosphate, etc. In aqueous media, the pH is most conveniently adjusted using an aqueous solution of sulfur dioxide.

Any free radical generating catalyst may be used in the practice of this invention. Typical of such catalysts are the peroxide catalysts, actinic radiation, etc. Such will be obvious to those skilled in the art and this invention shall not be limited in this regard. Temperature is of importance only as regards the generation of free radicals and is generally adjusted to effect interpolymerization within reasonably short periods of time without letting the reacion rate become uncontrollable. Temperatures of from about —20° centigrade to 250° centigrade, and preferably from about 25° centigrade to 150° centigrade, are not unusual.

In a preferred embodiment, substantially homogeneous terpolymers may be prepared by emulsion polymerization in an aqueous media using a conventional emulsifying agent. Maximum homgeneity of the product is obtained as portrayed in the examples by charging an initial monomer mixture of the several monomers combined in proportions calculated to approximate those of the kettle charge at equilibrium for the desired polymer composition. After polymerization is initiated, a continuous or semi-continuous stream of monomer mixture in proportions substantially the same as the composition of the interpolymer prepared will serve to maintain these equilibrium proportions.

GRAFT COPOLYMER

By polymerizing the monomers of the superstrate in presence of a diene rubber, some chemical combination occurs between the rubber and interpolymer components. In describing such blends, it has become customary to use the term "graft copolymer substrate" to designate the diene rubber component because of the large number of cases in which it has not been found possible to extract any of the diene rubber from the blends with the usual rubber solvents, although it is believed that some of the polymer chains of the rubber may not be in actual chemical combination with the polymer in some of the blends. "Graft copolymer superstrate" is the term used to designate that interpolymer which has been polymerized in the presence of the diene rubber. At least a small amount of the superstrate is not in chemical combination with the substrate because of the less-than-100 percent grafting efficiency of conventional graft copolymerization reactions.

GRAFT COPOLYMER SUBSTRATE

The graft copolymer has a substrate of any diene rubber or mixture of diene rubbers, i.e., any rubbery polymer (a polymer having a second order transition temperature not higher than 0° centigrade, preferably not higher than −20° centigrade, as determined by ASTM Test D–746–52T) of one or more conjugated 1,3-dienes, e.g. butadiene, isoprene, piperlylene, chloroprene, etc. Such rubbers include homopolymers of conjugated 1,3-dienes, interpolymers of conjugated 1,3-dienes with one another, and interpolymers of one or more 1,3-dienes with up to an equal amount by weight of one or more copolymerizable monoethylenically unsaturated monomers, such as monovinylidene aromatic hydrocarbons (e.g., styrene; an ar-alkyl-styrene, such as the ortho-, meta- and paramethylstyrenes, 2,4-dimethylstyrene, the ar-ethylstyrenes, p-t-butylstyrene, ec.; an alpha-alkylstyrene, such as alpha-methylstyrene, alpha-ethylstyrene, alpha-methyl-p-methylstyrene, etc.; vinyl naphthalene, etc.), ar-halo monovinylidene aromatic hydrocarbons (e.g., the ortho-, meta- and para-chlorostyrenes, 2,4-dibromostyrene, 2-methyl-4-chlorostyrene, etc.), acrylonitrile, methacrylonitrile, alkyl acrylates (e.g., methyl acrylate, butyl acrylate, 2-ethylhexyl acrylate, etc.), the corresponding alkyl methacrylates, acrylamides (e.g., acrylamide, methacrylamide, N-butyl-acrylamide, etc.), unsaturated ketones (e.g., vinyl methyl ketone, methyl isopropenyl ketone, etc.), alpha-olefins (e.g., ethylene, propylene, etc.), vinyl pyridines, vinyl esters (e.g., vinyl acetate, vinyl stearate, etc.), vinyl and vinylidene halides (e.g., the vinyl and vinylidene chlorides and bromides, etc.) and the like. The preferred rubber substrates are those of butadiene, isoprene or copolymers with each other and with monovinylidene aromatic hydrocarbons (preferably styrene) or a nitrile (preferably acrylonitrile).

The rubber can (and frequently does) also contain up to about 2.0 percent, advantageously 0.5 to 1.5 percent, of a cross-linking agent, based on the weight of the rubber-forming monomer or monomers. The cross-linking agent can be any of the agents conventionally employed for cross-linking diene rubbers, e.g., divinylbenzene, diallyl maleate, diallyl fumarate, diallyl adipate, allyl acrylate, allyl methacrylate, diacrylates and dimethcrylates of polyhydric alcohols, e.g., ethylene glycol dimethacrylate, etc.

According to a preferred embodiment of the invention, the diene rubber is a rubber which has been prepared with proper regulation of the degree of conversion and/or of a cross-linking agent content to provide a rubber having a swelling index at least as high as 11, preferably 11 to 20, in benzene, as determined by (a) maintaining a mixture of 0.3 gram of the rubber and 75 milliliters of benzene in total darkness for twenty-four hours at 20° centigrade, (b) filtering the mixture through a 100 mesh stainless steel screen, (c) washing the benzene-insoluble portion of the rubber with 10 milliliters of benzene and determining the weight of the insoluble, solvent-swollen polymer, (d) evaporating an aliquot of the filtrate to dryness to determine the weight of the benzene-soluble portion of the rubber and (e) calculating the swelling index (i.e., the ratio of solvent-swollen gel to dry gel), in accordance with the equation:

Swelling index=

$$\frac{\text{wt. in grams of benzene-swollen polymer}}{0.3 = \text{wt. in grams benzene-soluble polymer}}$$

A preferred group of diene rubbers are those which consist essentially of 85.0 to 100.0 percent by weight of butadiene and/or isoprene and up to 15.0 percent by weight of a monovinylidene aromatic compound or nitrile. Butadiene-styrene copolymers having a combined styrene content of 5.0 to 15.0 percent by weight are particularly preferred.

GRAFT COPOLYMER SUPERSTRATE

The diene rubber substrate is grafted with a superstrate in the amount of 15–200 (preferably 30 to 100, and even more preferably 40 to 60) parts by weight of superstrate per 100 parts by weight of substrate. As previously indicated, the grafting is effected by polymerizing the monomers in the presence of the diene rubber substrate.

Although the superstrate may be a polymer of N-tertiary butylacrylamide with either vinylidene aromatic compounds or a nitrile (acrylonitrile or methacrylonitrile), the preferred compositions are polymers of all three to correspond in composition generally to the composition of the interpolymer matrix or rigid phase. In this manner, it is believed that increased chemical bonding between the interpolymer and graft copolymer is obtained with improvement in certain properties.

The vinylidene aromatic compounds employed in the superstrate are most usually styrene or alpha-methylstyrene, although other compounds may be used such as substituted alkylstyrenes, such as, e.g., ortho-, meta- and para-methylstyrenes, 2,4-dimethylstyrene, para-ethystyrene, etc.; substituted halostyrenes such as, e.g., alpha-chlorostyrene, 2,4-dichlorostyrene, ortho-, meta-, and para-chlorostyrenes or bromostyrenes, etc.; and substituted alkyl halo styrenes such as, e.g., 2-methyl-4-chlorostyrene, etc. If so desired, mixtures such as vinylidene aromatic compounds may be used. The alkyl groups generally contain from 1 to 4 carbon atoms and include, in addition to those groups shown above, isopropyl, isobutyl, etc.

The copolymers and terpolymers for the superstrate may be comprised of the monomeric compounds in virtually any proportion, but preferably correspond to the composition of the interpolymer of the matrix for optimum bonding. Accordingly, in the preferred embodiment, the superstrate will be a terpolymer comprised of from about 15 to 70, and more preferably from about 25 to 50 percent by weight of the nitrile monomer, from about 20 to 60, and more preferably from about 25 to 50 percent by weight of the vinylidene aromatic compound and from about 20 to 50, and more preferably from about 15 to 35 percent by weight of N-tertiary butylacrylamide.

The novel graft copolymers of this invention may be manufactured by well-known techniques, for example, by mass polymerization, by emulsion or suspension polymerization, etc., of the monomers in the presence of the diene rubber substrate. As in the case of the interpolymer for the rigid phase, any free radical-generating catalyst may be used in forming the graft copolymer, such as peroxide catalysts, actinic radiation, etc. The temperature should be adjusted to control the generation of free radicals and to effect polymerization at the desired rate. In the preferred embodiment of the method of the present invention, the graft copolymer is prepared by emulsion polymerization of the monomers in an aqueous medium with conventional emulsifiers.

Exemplary of the efficacy of the present invention are the following specific examples in which all parts are parts by weight:

Example one

The reaction vessel is charged with 1000 parts distilled water and 3.0 grams, on a solids basis, of TRITON–X 200 (the sodium salt of a sulfonated alkylaryl polyether alcohol) and 1.5 grams of TRITON–X 100 (the sodium salt of a sulfonated alkylaryl polyether alcohol). The system is heated to reflux and maintained thereat, under a nitrogen atmosphere which is maintained through the polymerization, for fifteen minutes to degas the system. The temperature is adjusted to about 85° centigrade, and the pH is adjusted to about 3.5 by sulfur dioxide.

Initially monomer mixture A is added to the reaction vessel which contains 71.0 parts by weight of acrylonitrile, 2.5 parts by weight styrene and 26.0 parts by weight of N-tertiary butylacrylamide. As soon as an exothermic reaction indicates that polymerization has started, streams of the following components are continuously charged at a substantially uniform rate over a period of one and one-half hours: A warm monomer mixture containing 100 parts by weight acrylonitrile, 50 parts by weight styrene, and 50 parts by weight of N-tertiary butylacrylamide; and a catalyst solution comprising 62 parts by weight of a 1.0 percent solution of potassium persulfate. Upon completion of the addition of the above components, polymerization is quenched by rapidly cooling the reaction mixture to about 5° centigrade. Residual monomers and water are separated by freezing the reaction mixture to −30° centigrade overnight. After thawing, the polymeric solids are repeatedly washed with hot water and then with methanol. Upon drying, the product is found to be a solid white, substantially homogeneous interpolymer (50:25:25) of acrylonitrile/styrene/N-tertiary butylacrylamide. The intrinsic viscosity of the interpolymer is found to be 1.57 deciliters per gram in dimethyl formamide.

A latex of butadiene copolymer (90 butadiene:10 styrene) is purged with nitrogen for several hours and stored under a nitrogen atmosphere. To a reaction vessel are added 670 parts of the rubber latex, 800 parts distilled water and 0.485 part of potassium persulfate. The flask is purged with nitrogen and is placed in a water bath maintained at 60°±0.5° centigrade. Monomer mixture A consisting of about 71 parts by weight of acrylonitrile, 2.5 parts by weight styrene and 26 parts by weight N-tertiary butylacrylamide are then gradually added thereto. Approximately fifteen minutes thereafter, to the reaction vesel is added a warm monomer mixture consisting of about 100 parts by weight acrylonitrile, 50 parts by weight styrene, 50 parts by weight N-tertiary butylacrylamide and 0.3 percent by weight tertiary dodecyl mercaptan over a period of about three and one-half hours. The batch is agitated for about fifteen minutes and then charged with a latex providing 2.0 percent by weight solids based upon the diene rubber substrate of a styrenated phenol (WING-STAY S, Goodyear Chemical Company) and cooled in ice water under nitrogen, following which it is frozen overnight at −30° centigrade. After thawing, the polymeric solids are repeatedly washed with hot water, slurried in hot water, filtered and dried at 65° centigrade under vacuum. The resulting graft copolymer is found to contain 52 parts by weight of the superstrate (50 acrylonitrile/25 styrene/25 N-tertiary butylacrylamide) per 100 parts by weight of the diene rubber substrate.

The graft copolymer was blended with the interpolymer in an amount sufficient to produce 16 percent by weight of the diene rubber substrate based upon the total weight of the blend. In addition, the blends include 1 part by weight of a butylated hydroxytoluene (IONOL) and 2 parts by weight of a styrenated-phenol latex (WING-STAY S).

Tensile specimens are fabricated by compression molding and are 3.75 inches in length, 0.25 inch in width and 0.125 inch in thickness. Upon tensile testing, the strength at yield is found to be 11,200 pounds per square inch and at fail 10,800 pounds per square inch. The percent elongation at fail is 12 percent, and the total energy to failure is 1100 inch-pounds per cubic inch. The heat distortion temperature is found to be 97° centigrade.

In comparison, a blend having a rigid phase of styrene-acrylonitrile (72:28) and a grafted rubber with a butadiene-styrene substrate (90:10) and a superstrate of styrene-acrylonitrile (80:20) exhibits the following properties: Tensile strength at yield of 7200 pounds per square inch and at fail of 6400 pounds per square inch, with percent elongation at fail of 12 to 16 percent. The total energy to failure is 800 to 1500 inch-pounds per cubic inch, and the heat distortion temperature is only 92 to 96° centigrade.

Example two

The procedure of Example one is substantially repeated except that the interpolymer of the rigid phase has an intrinsic viscosity of 1.12 deciliters per gram, and the graft copolymer contains 61.7 parts by weight of superstrate per 100 parts of substrate.

Upon testing, this blend is found to have a heat distortion temperature of 106° centigrade.

Example three

The procedure of Example one is substantially repeated except that the monomers in both the interpolymer and the graft copolymer are adjusted to provide a composition in the interpolymer and in the superstrate of 50 parts styrene/25 parts acrylonitrile/25 parts N-tertiary butylacrylamide. The intrinsic viscosity of the interpolymer rigid phase of 0.77 deciliters per gram, and the graft copolymer contains 65.6 parts superstrate per 100 parts by weight of substrate.

Upon testing, the specimens exhibit a tensile strength at yield of 7500 pounds per square inch and at failure of 6850 pounds per square inch. The percent elongation at failure is 14 percent, and the total energy to failure is 670 inch-pounds per cubic inch. The heat distortion temperature is 100° centigrade.

Example four

A procedure similar to that of Example three is substantially repeated except that the graft copolymer is grafted to the extent of 41.7 parts by weight per 100 parts by weight of the substrate, and the interpolymer of the rigid phase has an intrinsic viscosity of 2.71 deciliters per gram.

Upon testing, the tensile strength is found to be 8200 pounds per square inch at yield and 8100 pounds per square inch at failure. The percent elongation at failure is 24 percent, and the total energy to failure is 1660 inch-pounds per cubic inch. The heat distortion temperature is found to be 106° centigrade.

Example five

The procedure of Example one is substantially repeated except that the monomers in the interpolymer or rigid phase and in the graft copolymer are adjusted to provide a composition in the rigid phase and in the superstrate containing 50 parts by weight of alpha-methylstyrene, 25 parts by weight of acrylonitrile and 25 parts by weight of N-tertiary butylacrylamide. The intrinsic viscosity of the interpolymer is found to be 1.09 deciliters per gram, and the graft copolymer is found to contain 41 parts by weight of the superstrate per 100 parts of the substrate.

Upon testing, specimens of the blend are found to have a tensile strength at yield of 8450 pounds per square inch and at failure of 8150 pounds per square inch. The percent elongation at failure is 14 percent, and the total energy to failure is 940 inch-pounds per cubic inch. The heat distortion temperature is determined to be 120° centigrade.

It will be appreciated that the blends of the present invention may be modified by the incorporation of additives such as dyes, pigments, stabilizers, plasticizers, fillers, extenders, etc.

Thus, it can be seen from the foregoing specification and examples that a novel polymer blend may be attained having improved thermal properties. If so desired, a substantially transparent material may be prepared by matching the refractive index of the graft copolymer and that of the interpolymer or rigid phase. As can be seen, the use of alpha-methylstyrene in place of styrene improves the thermal properties of these blends still further. Accordingly, the novel blends of the present invention afford improved properties for various applications wherein thermal resistance is significant and also enable the provision of transparent or highly translucent materials where so desired.

It is obvious that many variations may be made in the products and processes set forth above without departing from the spirit and scope of this invention.

What is claimed is:

1. A composition comprising an intimate blend of (A) about 50 to 99 wt. percent of an interpolymer of (1) a nitrile selected from the class consisting of acrylonitrile and methacrylonitrile, (2) N-tertiary butylacrylamide, and (3) a vinylidene aromatic compound selected from the class consisting of styrene, alpha-methylstyrene, alpha-halostryenes, aryl-substituted halo and lower alkyl styrenes, and mixtures thereof; and (B) about 1 to 50 wt. percent of a graft copolymer having (1) a diene rubber substrate and (2) a terpolymer superstrate containing N-tertiary butylacrylamide, a vinylidene aromatic compound selected from the group consisting of styrene, alpha-methylstyrene, alpha-halostyrenes, aryl-substituted halo and lower alkyl styrenes, and mixtures thereof, and a nitrile selected from the group consisting of acrylonitrile and methacrylonitrile.

2. A composition as in claim 1 wherein the vinylidene aromatic compound in said interpolymer is styrene and the nitrile is acrylonitrile.

3. A composition as in claim 1 wherein the vinylidene aromatic compound of said superstrate is styrene.

4. A composition as in claim 1 wherein the nitrile of said superstrate is acrylonitrile.

5. A composition as in claim 1 wherein said superstrate contains N-tertiary butylacrylamide, styrene and acrylonitrile.

6. A composition as in claim 1 wherein the nitrile of said interpolymer is acrylonitrile and the vinylidene aromatic compound of said interpolymer is styrene and wherein said graft copolymer superstrate contains N-tertiary butylacrylamide, styrene and acrylonitrile.

7. A composition as in claim 1 wherein said diene rubber substrate is a copolymer of butadiene and a monomer selected from the group consisting of (1) a nitrile selected from the class consisting of acrylonitrile and methacrylonitrile and (2) a vinylidene aromatic compound selected from the class consisting of styrene, alpha-methylstyrene, alpha-halostyrenes, aryl-substituted halo and lower alkyl styrenes, and mixtures thereof.

8. A composition comprising an intimate blend of (A) about 50 to 99 wt. percent of an interpolymer of (1) a nitrile selected from the class consisting of acrylonitrile and methacrylonitrile, (2) N-tertiary butylacrylamide, and (3) a vinylidene aromatic compound selected from the class consisting of styrene, alpha-methylstyrene, alpha-halostyrenes, aryl-substituted halo and lower alkyl styrenes, and mixtures thereof; and (B) about 1 to 50 wt. percent of a graft copolymer having (1) a diene rubber substrate and (2) a terpolymer superstrate containing N-tertiary butylacrylamide, a vinylidene aromatic compound selected from the class consisting of styrene, alpha-methylstyrene, alpha-halostyrenes, aryl-substituted halo and lower alkyl styrenes, and mixtures thereof, and a nitrile selected from the class consisting of acrylonitrile and methacrylonitrile, said rubber substrate comprising 5.0 to 20.0 percent by weight of said composition.

9. A composition as in claim 8 wherein said nitrile of said interpolymer and said graft copolymer superstate is acrylonitrile and wherein said vinylidene aromatic compound of said interpolymer and graft copolymer superstrate is styrene.

10. A composition as in claim 8 wherein said graft copolymer substrate is selected from the group consisting of butadiene and copolymers of butadiene with a monomer selected from the group consisting of a nitrile selected from the class consisting of acrylonitrile and methacrylonitrile and a vinylidene aromatic compound selected from the class consisting of styrene, alpha-methylstyrene, alpha-halostyrenes, aryl-substituted halo and lower alkyl styrenes and mixtures thereof.

11. A composition comprising an intimate blend of (A) about 50 to 99 wt. percent of an interpolymer of acrylonitrile, styrene and N-tertiary butylacrylamide and (B) about 1 to 50 wt. percent of a graft copolymer having a diene rubber substrate selected from the group consisting of butadiene, isoprene and copolymers thereof with each other and with monomers selected from the class consisting of a monovinylidene aromatic compound selected from the class consisting of styrene, alpha-methylstyrene, alpha-halostyrenes, aryl-substituted halo and lower alkyl styrenes, and mixtures thereof, and an unsaturated nitrile selected from the group consisting of acrylonitrile and methacrylonitrile and mixtures thereof, and a terpolymer superstrate containing N-tertiary butylacrylamide, styrene and acrylonitrile, said superstrate being present in the amount of 20 to 200 parts per 100 parts by weight of said substrate, at least 80.0 percent of said superstrate being chemically combined with said substrate, said rubber substrate comprising 5.0 to 20.0 percent by weight of said composition.

12. A process for preparing the compositions of claim 1 which comprises (A) interpolymerizing a vinylidene aromatic compound selected from the class consisting of styrene, alpha-methylstyrene, alpha-halostyrenes, aryl-substituted halo and lower alkyl styrenes, and mixtures thereof, an unsaturated nitrile selected from the class consisting of acrylonitrile and methacrylonitrile and N-tertiary butylacrylamide to form a terpolymer thereof; (B) forming discrete particles of said interpolymer; (C) preparing a graft copolymer having a diene rubber substrate and a terpolymer superstrate containing N-tertiary butylacrylamide, a vinylidene aromatic compound selected from the class consisting of styrene, alpha-methylstyrene, alpha-halostyrenes, aryl-substituted halo and lower alkyl styrenes, and mixtures thereof, and a nitrile selected from the class consisting of acrylonitrile and methacrylonitrile; (D) forming discrete particles of said graft copolymer; and (E) thoroughly blending about 1 to 50 wt. percent of said graft copolymer and about 99 to 50 wt. percent of said interpolymer to produce a substantially uniform blend thereof.

13. The method in accordance with claim 12 wherein the nitrile of said interpolymer is acrylonitrile and the vinylidene aromatic compound of said interpolymer is styrene and wherein said graft copolymer superstrate contains N-tertiary butylacrylamide, styrene and acrylonitrile.

14. A process for preparing the compositions of claim 1 which comprises (A) interpolymerizing styrene, acrylonitrile and N-tertiary butylacrylamide to form a terpolymer thereof; (B) forming discrete particles of said interpolymer; (C) preparing a graft copolymer having a diene rubber substrate selected from the group consisting of butadiene, isoprene and copolymers of butadiene and isoprene with each other and with a compound selected from the class consisting of a vinylidene aromatic compound selected from the group consisting of styrene, alpha-methylstyrene, alpha-halostyrenes, aryl-substituted halo and lower alkyl styrenes, and mixtures thereof, and a nitrile selected from the group consisting of acrylonitrile and methacrylonitrile, a terpolymer superstrate containing styrene, acrylonitrile and N-tertiary butylacrylamide, said graft copolymer containing 15 to 200 parts by weight of superstrate per 100 parts of substrate and having at least 80.0 percent of the superstrate chemically combined with the substrate; (D) forming discrete particles of said graft copolymer; and (E) thoroughly blending said graft copolymer and said interpolymer to produce a substantially uniform blend thereof containing 5.0 to 20.0 percent by weight of said rubber substrate and 95.0 to 80.0 percent by weight of the terpolymer.

References Cited

UNITED STATES PATENTS

| | | | |
|---|---|---|---|
| 3,073,798 | 1/1963 | Baer | 260—876 |
| 3,313,790 | 4/1967 | Baer | 260—80.73 |

GEORGE F. LESMES, *Primary Examiner.*